May 12, 1931.  H. HASTINGS  1,805,176
PRESSURE GAUGE
Filed Feb. 27, 1926
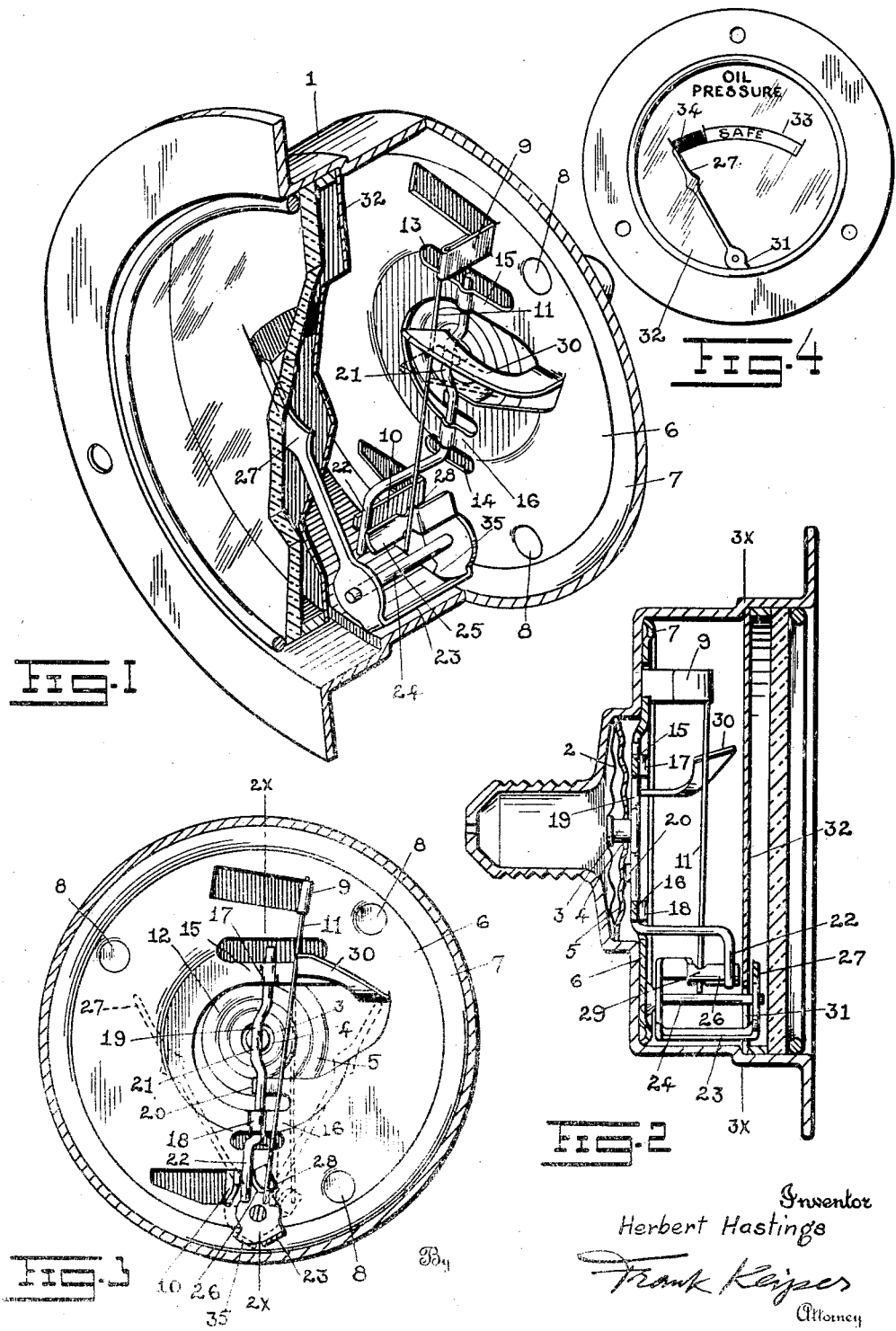
Inventor
Herbert Hastings
Frank Keipser
Attorney Patented May 12, 1931

1,805,176

UNITED STATES PATENT OFFICE

HERBERT HASTINGS, OF ROCHESTER, NEW YORK

PRESSURE GAUGE

Application filed February 27, 1926. Serial No. 91,237.

The object of this invention is to provide an improved and simplified construction for pressure gauges and their movements.

Another object of this invention is to provide the gauge with a simplified retarding spring and tension regulating member that makes it possible to adjust both the tension and the effective length of the spring over a wide range, and operating as a means to assist in calibrating.

Another object of this invention is to provide the gauge with an indicating dial having a safe and a danger zone for the purpose of giving but two indications to either indicate that the pressure is within a safe range or has dropped to a point where the pressure is insufficient for the work to be performed by it.

Another object is to provide compensating means between the diaphragm expansion member and the pointer so that the movement of one relative to the other may be successively varied.

Another object is a construction in which an integral part of the pointer engages with the multiplying lever as distinguished from the usual practice of attaching the pointer to an oscillating post or the like.

Another object is to provide a movement in which the bearings for the oscillating multiplying lever may be of a smooth burnished finish so as to offer the minimum of resistance to the swinging of the lever as distinguished from a cut bearing.

These and other objects of this invention will be fully illustrated in the drawing, described in the specification and pointed out in the claims at the end thereof.

In the accompanying drawings:

Figure 1 is an enlarged perspective view of the gauge with a portion of its casing broken away to illustrate the operating mechanism thereof.

Figure 2 is a vertical cross section of the gauge, the section being taken on the line 2x—2x of Figure 3.

Figure 3 is a vertical sectional view of the gauge, the section being taken on the line 3x—3x of Figure 2.

Figure 4 is a front elevation of the gauge illustrating the improved dial thereof.

In the several figures of the drawings like reference numerals indicate like parts.

The pressure gauge construction forming the subject matter of my present invention is an improvement over the gauge construction illustrated in my prior Patent No. 1,399,177 issued December 6, 1921. In this construction the casing 1 and diaphragm 2 for operating the mechanism remain as illustrated in the patent above referred to, except that an extension button 3 is suitably fastened to the center of the diaphragm 2 and extends thru the opening 4 in the diaphragm cover or stop plate 5. It is the transmission of the movement of the diaphragm to the indicator which has been improved upon by simplifying the construction thereof, making it easier to assemble and more readily adjustable over a wider range and providing bearings in which the bearing surfaces are formed in the burnished metal and are perfectly smooth, much more so than are the bearing surfaces of cut bearings.

All of the operating members of the gauge mechanism are mounted on the base plate 6 which is circular in outline and has the bead 7 formed around the circular edge thereof. In the base plate are provided a series of three depressions 8, 8 which serve as supporting lugs for the base plate and are adapted to rest against the inner wall of the casing 1 to line up the base plate with relation thereto. From the base plate are struck up the lugs 9 and 10 the one forming the support or anchor for the spring 11 and the other forming a stop limiting the movement of the indicator in one direction as will presently appear. The lug 9 struck up from the base plate to support and anchor the end of the spring 11 has a portion of it bent over on itself and the end of the spring to firmly clamp the spring in place near the outer end of the lug.

In the center of the base plate is provided the large opening 12 and near this opening at diametrically opposite points, are cut out the elongated holes or slots 13 and 14. The metal surrounding the opening 12 including the edge of the openings of the slots 13 and 14 adjacent to the opening 12 is depressed. Two narrow strips of metal 15 and 16 are thus formed at the level of the bottom of the depression at two diametrically opposite points of the opening 12. In the under side of these strips are struck up the semi-circular bearings 17 and 18 which are in line with each other and have the crank shaft 19 mounted to oscillate therein. In assembling the mechanism of the gauge the crank shaft 19 is held in place in the bearings 17 and 18 by the finger 20. This finger is integral with the base plate and projects into the opening 12 opposite to the strip 16 and the bearing 18 formed therein. The finger engages the under side of the crank shaft after it is placed into the bearing holding the shaft in place therein. The fact that the bearings 17 and 18 are formed on narrow strips of metal makes it possible to raise or lower one or both of these bearings by bending these strips until the bearings support the shaft in proper alignment with relation to the top of the extension button 3 of the diaphragm.

The crank shaft 19 is provided with an offset 21, which is formed on this shaft intermediate of the bearings 17 and 18 and is located directly above the extension button 3 of the diaphragm so that it can rest thereon. One end of the crank shaft is bent up and out to form the crank 22 for operating the pointer unit 23. This unit is yoke shaped with bearings provided in both sides thereof. In the base plate is anchored or otherwise suitably mounted the stud 24. This stud projects thru the bearings of the pointer unit and forms a pivot on which the pointer unit oscillates.

One side of the yoke shaped pointer unit is bent up and formed into the crank 25. The outer end of this crank has a contact surface having a geometric curvature on one side for a purpose that will presently appear. The crank 22 of the crank shaft 19 normally rests against the geometrically curved contact surface 26 so that when the crank shaft 19 is oscillated on the movement of the diaphragm, the pointer unit 23 in turn is oscillated by it.

The free end of the spring 11 yieldingly rests against the back of the geometrically curved contact surface and holds this surface gainst the crank 22 and holds the pointer unit down against the shoulder of the stud 24, and in turn forces this crank against the stationary lug 10. In this way both the crank shaft 19 and the pointer unit 23 are held in a predetermined starting position in which the pointer 27 of the gauge indicates zero pressure.

As illustrated in the figures of the drawings the pointer 27 is integral with the pointer unit 23 and is simply an extension of the outer side of this yoke shaped member. In the crank 25 of the pointer unit is provided a shoulder 28 and the free end of the spring 11 yieldingly rests against the crank immediately above this shoulder. In this way the spring 11 also serves to hold the crank 25 and pointer unit of which it forms a part against endwise movement on the pivot stud 24 and possible disengagement therefrom. The crank 25 is notched on both sides forming a reduced neck 29 which the end of the spring 11 engages to make the pressure of the spring bear as close as possible to the central axis of the crank. In this way the pressure of the spring is applied as uniformly as possible to the crank during its oscillation and in all of its positions. For the purpose of adjusting the pressure or tension of the spring 11 as applied to the crank 25 of the pointer unit, an adjustable lug 30 is provided. This lug is struck up from the base plate 6 at one side of the central opening 12. The lug projects with its outer edge against one side of the spring 11 and can be bent to bear against the spring in this way over a wide range at varying distances from the firmly anchored end of the spring 11. It is also possible to bend the lug 30 back so that it will not bear against the spring at first so as not to increase its tension during the initial movement of the crank shaft but act on it only during the latter part of the movement of the pointer unit. In this way a very accurate adjustment of the tension of the spring can be secured so that the indication given by the gauge will be accurate over the whole range of the movement of the pointer over the dial of the gauge.

The pointer 27 projects thru the opening 31 in the dial 32 and in oscillating swings over the outside of the dial and points to the pressure zones laid off on this dial.

It will be noted that only two such zones are provided, one the short zone 34 and the other the long zone 33. The long zone 33 is marked "Safe" and indicates that while the pointer indicates within this zone the pressure is sufficient and safe. The smaller zone 34 has preferably a colored field such as red to denote danger. The pressure indicated by the pointer when swinging within the limits of this zone is to be regarded dangerously low. The two zones thus cover the full range of the pressure as indicated by the gauge and in the two readings that can be taken from it indicate either a satisfactory or unsatisfactory pressure.

As will be seen from an inspection of Figure 3 the geometrically curved contact surface of the crank 25 is designed to successively increase and decrease the distance between the center of rotation of the pointer unit and its point of contact with the crank 22 of the crank shaft as the crank moves through its range. The active radius of the crank 25 of the pointer unit is therefore largest at the beginning of its movement and decreases until it reaches the end of its movement. This compensates for the changing ratio between the pressure applied to the gauge and the movement of the diaphragm caused by it. The increment of movement of the diaphragm may be largest at the beginning in relation to the increment of pressure and thus the movement of the diaphragm would gradually diminish under the succeeeding increments of pressure. For this reason the contact surface of the crank 25 of the pointer unit is such as to cause the crank 22 of the crank shaft to slide over it from the outer or remote edge of the contact surface on the crank 25 to the inner or nearer edge thereof, when rocking the pointer unit from zero position to maximum position. That is, it starts with the longer radius of contact with the crank of the pointer causing a relatively slow angular movement and gradually diminishes to a shorter radius of contact with the crank of the pointer with a relatively faster angular movement. The sliding contact between the crank of the crank shaft and the crank of the pointer unit thus compensates for the irregular movement of the diaphragm by shortening or lengthening the effective radius of the crank 25 and causes the pointer of the gauge to indicate the true pressure on equal divisions of the dial.

Another feature of the construction of this gauge that deserves special mention is the formation of the bearings 17 and 18. These bearings are struck up from the burnished metal of the base plate and have, therefore, a burnished bearing surface. The crank shaft 19 mounted to oscillate in these bearings has, therefore, bearing surfaces that need not be worn in before the friction caused by them is reduced to a minimum.

Much of the proper working of the pressure gauge depends on the ability to correctly adjust the spring 11. This spring places an opposing pressure on the movement of the diaphragm and the members operated by it. The pressure exerted by the spring 11 performs the corresponding function of the hair spring in a watch and regulates the movement of the pointer of the gauge for a predetermined pressure. The straight spring 11 used in the construction of this gauge performs this function with a higher degree of accuracy than has heretofore been possible. This is due to the fact that the spring is used in its straight form, that is without putting bends or kinks into it which not only increases the cost of manufacture of it, but changes the characteristic of the spring so that it no longer exerts the same uniform pressure it exerted while in its straight form. As in the hair spring of a watch the tension of the spring 11 must be regulated or adjusted. This is very easily and accurately done on the straight spring 11 as the lug 30 adapted for this purpose can be moved along the side of the spring over a considerable distance and is either held in contact with it or moved away from it to make contact with it only after it has been bent by an initial movement of the diaphragm.

The lug 10 which serves as stop against which the crank 22 of crank shaft 19 is forced thru the crank 25 by means of the spring 11, also determines the starting position of the pointer 27. If the lug holds the crank 22 in a position in which the corresponding position of the pointer does not register with the zero line of the dial, it may be bent to either one side or the other until the pointer has been given the correct starting position.

The lug 10 also serves as the stop that determines the maximum position of the pointer. For this purpose the shoulder 35 is provided on the inner side of the yoke shaped pointer unit and engages the side of the lug 10 after the pointer unit has been rocked thru a predetermined arc.

I claim:

1. In a pressure gauge having a diaphragm and a base surrounding said diaphragm, the combination of a shaft contacting with said diaphragm to rotate said shaft on the movement of said diaphragm, a pointer unit, a crank on said shaft, a straight flexible member mounted on said base and held rigid at one end thereof, the free end of said flexible member holding said pointer unit and said crank yieldingly in contact with each other, a movable lug on said base adapted to be swung in a vertical plane parallel to said straight flexible member and either rest against said flexible member or be held away from it at a variable distance for the purpose of controlling the tension of said flexible member.

2. In a pressure gauge having a diaphragm and a base surrounding said diaphragm, the combination of a shaft formed to connect with said diaphragm to rotate said shaft on the movement of said diaphragm, a crank on said shaft, a pointer unit, a pivot pin for said pointer unit, a crank on said pointer unit, said crank on said shaft engaging said crank on said pointer unit, a spring member mounted on said base and yieldingly holding said crank on said shaft in contact with said crank on said pointer unit, a shoulder on said crank of said pointer unit, said spring member projecting over said shoulder to hold said pointer unit in place on said pivot pin.

3. In a pressure gauge, the combination of a U-shaped pointer unit, a pivot pin for said pointer unit, a pointer formed on one side of said pointer unit, a crank struck up from the other side of said pointer unit parallel to said pivot pin, a curved elongated contact surface on said crank, a second crank engaging said contact surface of said first crank, said second crank being adapted to rotate said first crank and slide over said curved contact surface thereof toward or away from the center of rotation of said pointer unit.

4. In a pressure gauge, the combination of a U shaped pointer unit, a pivot pin for said pointer unit, a pointer formed on one side of said pointer unit, a crank struck up from the other side of said pointer unit parallel to said pivot pin, a curved elongated contact surface on said crank, a second crank engaging said contact surface of said first crank, said second crank being adapted to rotate said first crank.

5. In a pressure gauge, the combination of a base plate, a pair of flexible bearing strips provided on said base plate, a semi-circular bearing formed in each of said bearing strips, a shaft mounted to oscillate in said bearings, a finger on said plate holding said shaft in place in said bearings, an offset in said shaft, means for moving said offset to rotate said shaft, a pointer unit pivoted on said base plate and means connecting said shaft with said pointer unit to swing said pointer unit on the rotation of said shaft.

6. In a pressure gauge, the combination of a base plate, a lug struck up from said base plate, a spring finger anchored on said lug, a pair of semi-circular bearings struck up into the under side of said base plate, a shaft mounted to oscillate in said pair of bearings, means for holding said shaft in place in said pair of bearings, a pivot pin mounted in said base plate, a pointer unit mounted on said pivot pin, a combined rocking and sliding connection between said shaft and said pointer unit to swing said pointer unit on the rotation of said shaft, said spring finger engaging said combined rocking and sliding connection, to retard the movement of said pointer unit and return said pointer unit and said shaft to its normal starting position.

7. In a pressure gauge, the combination of a base plate, a pivot pin anchored in said base plate, a pointer unit pivoted on said pin, a lug struck up from said base plate adjacent to said pointer unit, a crank shaft interposed between said lug and said pointer unit and yielding means normally holding said pointer unit and said crank shaft against said lug to limit their movement in one direction.

8. In a pressure gauge, the combination of a base plate, a pivot pin anchored in said base plate, a pointer unit pivoted on said pin, a lug struck up from said base plate adjacent to said pointer unit, a crank shaft interposed between said lug and said pointer unit and yielding means normally holding said pointer unit and said crankshaft against said lug to limit their movement in one direction, said pointer unit having a shoulder, said shoulder engaging the side of said lug to limit the movement of said pointer unit and said shaft in the opposite direction.

9. In a pressure gauge having a diaphragm, the combination of a base plate having an opening therein, a semi-circular bearing struck into said base plate on either side of the opening and parallel to said base plate, a crank shaft mounted in said bearings, an offset in said shaft located in the opening in said base plate and resting on said diaphragm to rotate said shaft on the movement of said diaphragm, a pointer unit pivoted on said base plate, and means connecting said pointer unit with said crank shaft to rock said pointer unit on the movement of said diaphragm.

10. In a pressure gauge having a diaphragm, the combination of a base plate having an opening therein, a semi-circular bearing struck into said base plate on either side of the opening and parallel to said base plate, a crank shaft mounted in said bearings, an offset in said shaft located in the opening in said base plate and resting on said diaphragm to rotate said shaft on the movement of said diaphragm, a pointer unit pivoted on said base plate, and means connecting said pointer unit with said crank shaft to rock said pointer unit on the movement of said diaphragm, and means carried on said base plate for limiting the movement of said pointer unit in either direction.

11. In a pressure gauge having a diaphragm, the combination of a base plate having a large central opening and small elongated openings adjacent to the large opening and located at diametrically opposite points thereof, said base plate having a strip of metal forming a bridge separating the large opening from each of the small openings, a semi-circular bearing struck up on the under side of each of said bridges, a shaft mounted to rotate in said bearings, an offset in said shaft located in said large opening and resting on said diaphragm, a crank formed on said shaft and projecting from the under side of said base plate thru one of said small openings in said base plate, a lug struck up from said base plate adjacent to said crank, a pointer unit pivoted on said base plate and engaging said crank, and yielding means resting against said pointer unit to hold it in engagement with said crank and force said crank in engagement with said lug to limit its movement on one direction.

12. In a pressure gauge, the combination of a base plate, a semi-cylindrical bearing struck up from said base plate, a shaft mounted to rotate in said bearing and a finger provided on said base plate and projecting over said shaft on the side opposite to said bearing to hold said shaft in place in said bearing.

13. In a pressure gauge, the combination of a diaphragm, a pointer unit, means for transmitting the motion of said diaphragm to said pointer unit, a straight spring retarding arm engaging said pointer unit, a flexible lug at one side of said straight spring arm and adapted to be moved to engage said spring arm at intermediate points before or after it has been flexed to increase the resistance of said spring arm.

14. A pointer unit for a gauge comprising two parallel bosses joined together by a yoke, said bosses having perforations therein adapted to form bearings for a stud, a pointer on one of said bosses, a bracket turned up on the other boss, a crank formed on said bracket, said crank being notched at the side to form a reduced neck, the crank outward of the notched part having a contact surface on one side having a geometric curvature.

15. A pointer unit comprising two perforated parallel bearings joined by a yoke, a pointer and a crank on said unit, one portion of said crank having a contact surface having a geometrical curvature, said portion being connected to said unit by a smaller neck portion.

In testimony whereof I affix my signature.

HERBERT HASTINGS.